(12) United States Patent
Fukushima

(10) Patent No.: US 11,782,663 B2
(45) Date of Patent: Oct. 10, 2023

(54) JOB MANAGEMENT APPARATUS, NON-TRANSITORY COMPUTER READABLE MEDIUM, AND JOB MANAGEMENT METHOD

(71) Applicant: FUJIFILM Business Innovation Corp., Tokyo (JP)

(72) Inventor: Mitsuhiro Fukushima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/704,018

(22) Filed: Mar. 25, 2022

(65) Prior Publication Data

US 2023/0088362 A1 Mar. 23, 2023

(30) Foreign Application Priority Data

Sep. 21, 2021 (JP) ................. 2021-153474

(51) Int. Cl.
*G06F 3/12* (2006.01)

(52) U.S. Cl.
CPC ............ *G06F 3/1267* (2013.01); *G06F 3/126* (2013.01); *G06F 3/1226* (2013.01); *G06F 3/1268* (2013.01)

(58) Field of Classification Search
CPC ...... G06F 3/1268; G06F 3/126; G06F 3/1226; G06F 3/1267
See application file for complete search history.

(56) References Cited

U.S. PATENT DOCUMENTS

| | | | |
|---|---|---|---|
| 9,602,680 B2* | 3/2017 | Ito | G06F 3/1204 |
| 10,042,592 B1* | 8/2018 | Soriano | G06F 3/1288 |
| 2015/0092247 A1* | 4/2015 | Ming | H04N 1/00326 358/3.28 |
| 2016/0077774 A1* | 3/2016 | Okada | G06F 3/1291 358/1.15 |

FOREIGN PATENT DOCUMENTS

| | | |
|---|---|---|
| JP | 2002333965 | 11/2002 |
| JP | 2006302038 | 11/2006 |

* cited by examiner

*Primary Examiner* — John R Wallace
(74) *Attorney, Agent, or Firm* — JCIPRNET (57) ABSTRACT

A job management apparatus includes a processor configured to: attach an order identifier, linked to a production order, to a job that has been created in response to the production order of a printed material; transmit the job and the order identifier attached to the job to one of printing systems to perform the job; when one of the order identifiers is specified and a reproduction order of the printed material corresponding to the specified order identifier is received, make an inquiry to the printing systems as to whether the printing systems have the job with the specified order identifier attached; and in response to a reply from each of the printing systems responding to the inquiry, detect a printing system storing the job corresponding to the reproduction order.

4 Claims, 9 Drawing Sheets

JOB MANAGEMENT APPARATUS, NON-TRANSITORY COMPUTER READABLE MEDIUM, AND JOB MANAGEMENT METHOD

CROSS-REFERENCE TO RELATED APPLICATIONS

This application is based on and claims priority under 35 USC 119 from Japanese Patent Application No. 2021-153474 filed Sep. 21, 2021

BACKGROUND (i) Technical Field

The present disclosure relates to a job management apparatus, a non-transitory computer readable medium, and a job management method.

(ii) Related Art

In general, printing companies typically receive production orders of printed materials, such as books, magazines, catalogs, and/or leaflets from customers, produce printed materials satisfying the production orders, and deliver the printed materials. In the production of the printed materials, offset printing machines, and digital printing machines (such as an electrophotographic printer or an ink-jet printer) have been utilized recently. Some of the digital printing machines have a cover insertion function and paper processing functions (a punching operation, stapling operation, saddle stitching operation, folding operation, cutting operation and other operations). The digital printing machine (printer) and print control apparatus controlling the printer are referred to as a printing system.

In response to a production order of printed material from a customer, a printing company issues order identification information (order identifier), such as an order number, to the production order. For example, the printing company receives from the customer a production specification sheet (indicating contents of a printed material per copy, number of copies produced, delivery destination, and the like), and document and image data (original document) and manages the production specification sheet and the document and image data with an order identifier linked thereto. The customer is also notified of the order identifier.

The printing company creates a job as digital data in accordance with the production specification sheet and document and image data received from the customer. For example, the job includes, on each component forming a printed material (such as a cover, back cover, contents, and the like), product information (sheet sizes, types, number of sheets, locations of images, and the like) and process information (such as process contents, flow of process, and the like), product information and process information on overall printed material, and image data for printing. The job is transmitted to a print control apparatus of the printing system. The print control apparatus performs data processing by interpreting the job, and causes a printer to output printed material by supplying instructions and raster images to a printer. The job is not deleted from the print control apparatus in the printing system immediately after the print process is performed by the printing system. Typically, the job is continuously stored for a specific period of time on the print control apparatus in order to further processing.

Japanese Unexamined Patent Application Publication No. 2006-302038 discloses a technique related to process control of a job of producing printed material. According to the technique, the job log and a relationship of a file to the job are managed and displayed in a tree structure such that a user may easily determine a target job and file.

Japanese Unexamined Patent Application Publication No. 2002-333965 discloses a technique where multiple apparatuses issue jobs. Identification on an apparatus having issued a job and date of issue of the job are included in a job name such that a user may easily identify the job.

The printing company may receive a reproduction order of a printed material (such as a reprint order). In the reproduction order of the printed material, the product specification sheet and the document and image data are not delivered from the customer to the printing company and the printing company is provided with only an order identifier linked to the previous production order. In response to the reproduction order of the printed material, an operator in the printing company tries to find a printing system having performed the job corresponding to the order and performs printing using the previous job stored on the print control apparatus in the printing system. It may be difficult for the operator to find, from among multiple printing systems, the print control apparatus storing the job corresponding to the reproduction order.

SUMMARY

Aspects of non-limiting embodiments of the present disclosure relate to saving time that an operator takes to find a printing system storing a job corresponding to a reproduction order when the reproduction order of a printed material is received.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a job management apparatus including a processor configured to: attach an order identifier, linked to a production order, to a job that has been created in response to the production order of a printed material; transmit the job and the order identifier attached to the job to one of printing systems to perform the job; when one of the order identifiers is specified and a reproduction order of the printed material corresponding to the specified order identifier is received, make an inquiry to the printing systems as to whether the printing systems have the job with the specified order identifier attached; and in response to a reply from each of the printing systems responding to the inquiry, detect a printing system storing the job corresponding to the reproduction order.

BRIEF DESCRIPTION OF THE DRAWINGS

Exemplary embodiment of the present disclosure will be described in detail based on the following figures, wherein.

DETAILED DESCRIPTION

Exemplary embodiment of the disclosure is described in detail with reference to the drawings. The configurations of the exemplary embodiment are described for exemplary purposes only and may be modifiable in view of specifications of a system and apparatus. If the disclosure includes multiple exemplary embodiments and modifications, features thereof may be utilized in an appropriate combination. Throughout the drawings, like elements are identified with like reference numerals and the discussion thereof is not duplicated.

Figure 1:
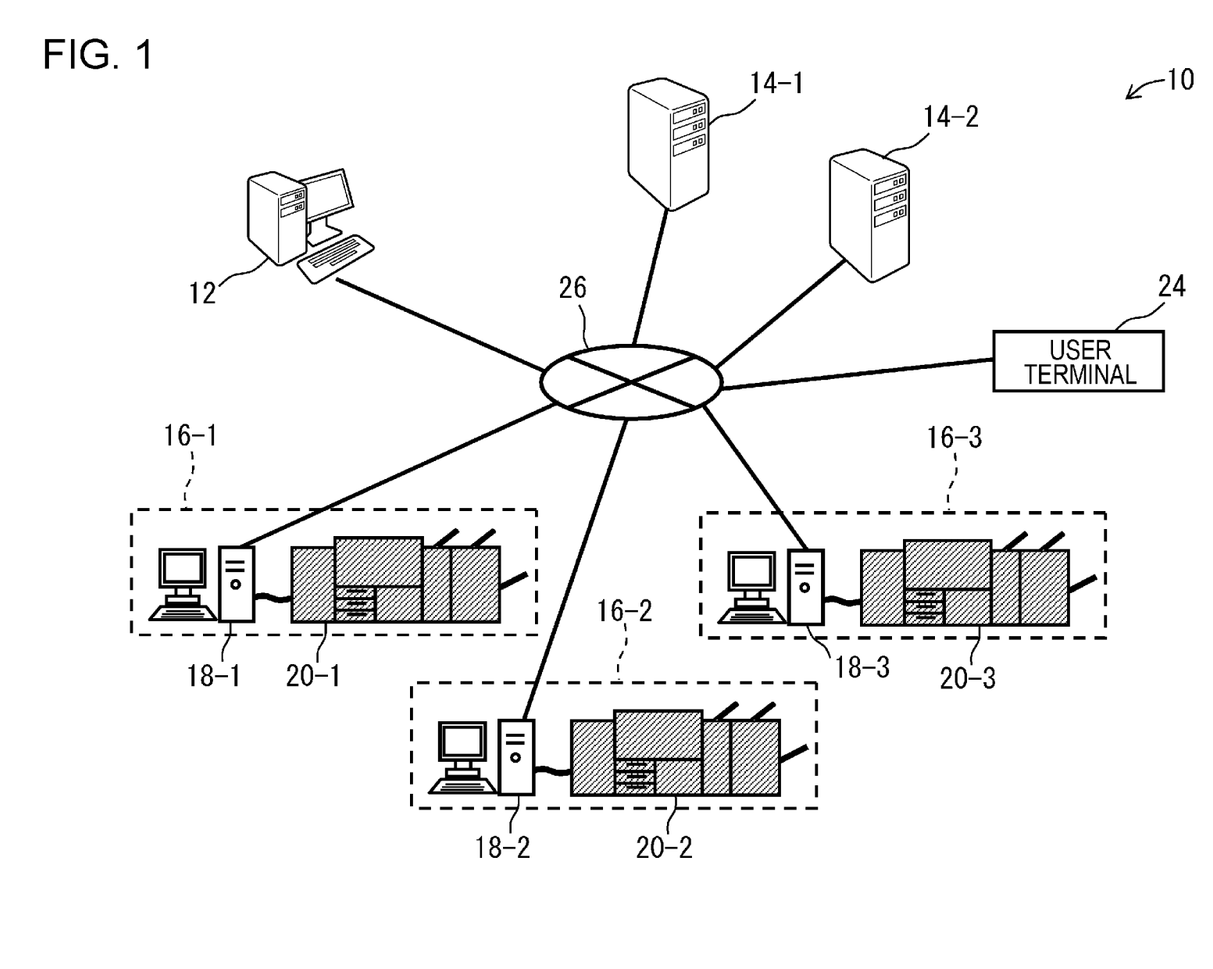
FIG. 1 illustrates a configuration of a production management system of a printed material.

FIG. 1 illustrates a configuration of a production management system 10 of a printed material. The production management system 10 is utilized by a printing company. The production management system 10 may also be utilized by other entities than a printing company.

The production management system 10 includes an ordering system 12, multiple process control apparatuses 14-1 and 14-2, multiple printing systems 16-1, 16-2, and 16-3, and user terminal 24. Those apparatuses and systems are communicably interconnected to each other via a network 26. The number of apparatuses and the number of systems are illustrated in FIG. 1 for exemplary purposes only and may be appropriately modified. If the process control apparatuses 14-1 and 14-2 are not differentiated from each other, each apparatus may be representatively referred to as a process control apparatus 14. If the printing systems 16-1, 16-2, and 16-3 are not differentiated from each other, each system is representatively referred to as a printing system 16. The network 26 may include a local-area network (LAN), Intranet, and/or Internet.

The ordering system 12 is a computer that manages a production order and reproduction order of printed material received from a customer.

The process control apparatus 14 is a computer managing the progress status of production of each printed material and is also referred to as a work-flow management apparatus. The process control apparatus 14 also operates as a job management apparatus. For example, the process control apparatus 14-1 manages production of magazines, catalogs, and leaflets as the printed materials. For example, the process control apparatus 14-2 manages production of books as the printed materials. In this way, the process control apparatuses 14 are utilized properly depending on the type of the printed materials. Alternatively, a single process control apparatus 14 may be utilized to manage the production of all the printed materials.

The printing system 16 includes a print control apparatus 18 and printer 20. If print control apparatuses 18-1 through 18-3 respectively in the printing systems 16-1, 16-2, and 16-3 are not differentiated from each other, each print control system is referred to as a print control apparatus 18. If printers 20-1 through 20-3 respectively in the printing systems 16-1, 16-2, and 16-3 are not differentiated from each other, each printer is referred to as a printer 20.

The printer 20 forms an image on a medium, such as a paper sheet. The printer 20 may also be referred to as an image forming apparatus. The printer 20 is an electrophotographic digital printer or an ink-jet digital printer. For example, the printer 20 is a production printer that is capable of printing at high-speed and high-accuracy level. Some or all of the printers 20 may have a cover insertion function and paper processing functions (including punching operation, stapling operation, saddle stitching operation, folding operation, and/or cutting operation). The printers 20 may output book-form printed material. Some or all of the printers 20 may have only a printing function.

The print control apparatus 18 is a computer controlling the printer 20 and may be referred to as a print server or a digital front end (DFE). The print control apparatus 18 creates a raster image by performing a raster image processor (RIP) operation on image data included in a job and transmits the raster image to the printer 20. The print control apparatus 18 has a function of reporting to the process control apparatus 14 a process status of each job managed by the print control apparatus 18.

The user terminal 24 may be a personal computer (PC), tablet, smart phone, or the like. The production management system 10 is configured for a user (also hereinafter referred to as an operator) to remotely operate the ordering system 12 and process control apparatus 14 with the user terminal 24 and to cause the user terminal 24 to display information stored on the ordering system 12 and process control apparatus 14.

Figure 2:
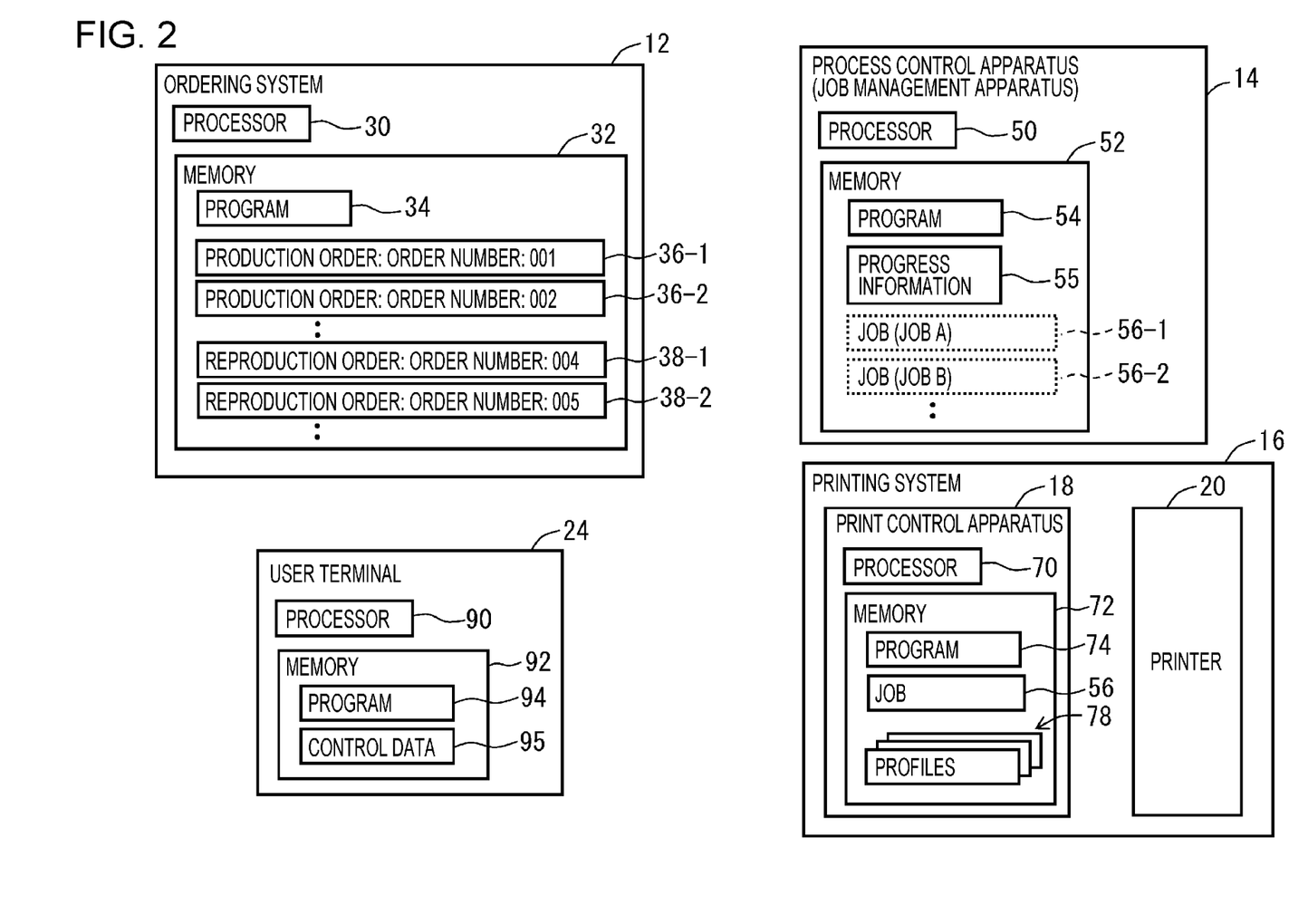
FIG. 2 is a functional block diagram illustrating apparatuses and systems in the production management system.

FIG. 2 is a functional block diagram illustrating apparatuses and systems in the production management system 10. The ordering system 12 includes a processor 30 and memory 32. The processor 30 includes a CPU and performs information processing in accordance with control data and a program 34, installed on the ordering system 12. The processor 30 may be construed as a computer in a narrow sense. The memory 32 may include a read-only memory (ROM), random-access memory (RAM), flash memory, and/or hard disk. The memory 32 stores the program 34, control data (not illustrated), information on production order 36-1, 36-2, . . . , and information on reproduction order 38-1, 38-2, . . . , and the like.

The process control apparatus 14 includes a processor 50 and memory 52. The processor 50 includes a CPU and performs information processing in accordance with control data and a program 54, installed on the process control apparatus 14. The processor 50 may be construed as a computer in a narrow sense. The memory 52 includes a ROM, RAM, flash memory, and/or hard disk. The memory 52 stores the program 34, control data (not illustrated), progress information on each job 55, and jobs 56-1, 56-2, . . . . If the jobs 56-1, 56-2, . . . are not differentiated from each other, each job is representatively referred to as a job 56.

The printing system 16 includes the print control apparatus 18 and printer 20. The print control apparatus 18 includes a processor 70 and memory 72. The processor 70 includes a CPU and performs information processing in accordance with control data and a program 74, installed on the print control apparatus 18. The processor 70 may be construed as a computer in a narrow sense. The memory 72 includes a ROM, RAM, flash memory, and/or hard disk. The memory 72 stores the program 74, control data (not illustrated), the job 56, printer profiles 78, and the like.

The user terminal 24 includes a processor 90 and memory 92. The processor 90 includes a CPU and performs information processing in accordance with control data 95 and a program 94, installed on the user terminal 24. The processor 90 may be construed as a computer in a narrow sense. The memory 92 includes a ROM, RAM, flash memory, and/or hard disk. The memory 92 stores the program 94, control data 95, and the like.

Programs executed by the processors of the apparatuses and systems are not only delivered via a network, such as the Internet, but also delivered by recording the programs on a computer readable recording medium, such as an optical disk or universal serial bus (USB) memory.

The processes of the production management system 10 are described below. A computer terminal of a customer, such as a PC (not illustrated), may now be connected to the network 26 (see FIG. 1). The ordering system 12 receives from the computer terminal an instruction for a production order of printed material, production specification sheet (contents of a printed material per copy, number of copies produced, delivery destination), and document and image data (original document). The production specification sheet and the document and image data are described herein as data received from the customer. The data from the customer is not limited to the data listed herein and may be any data as long as the data is used to create a job.

Figure 3:
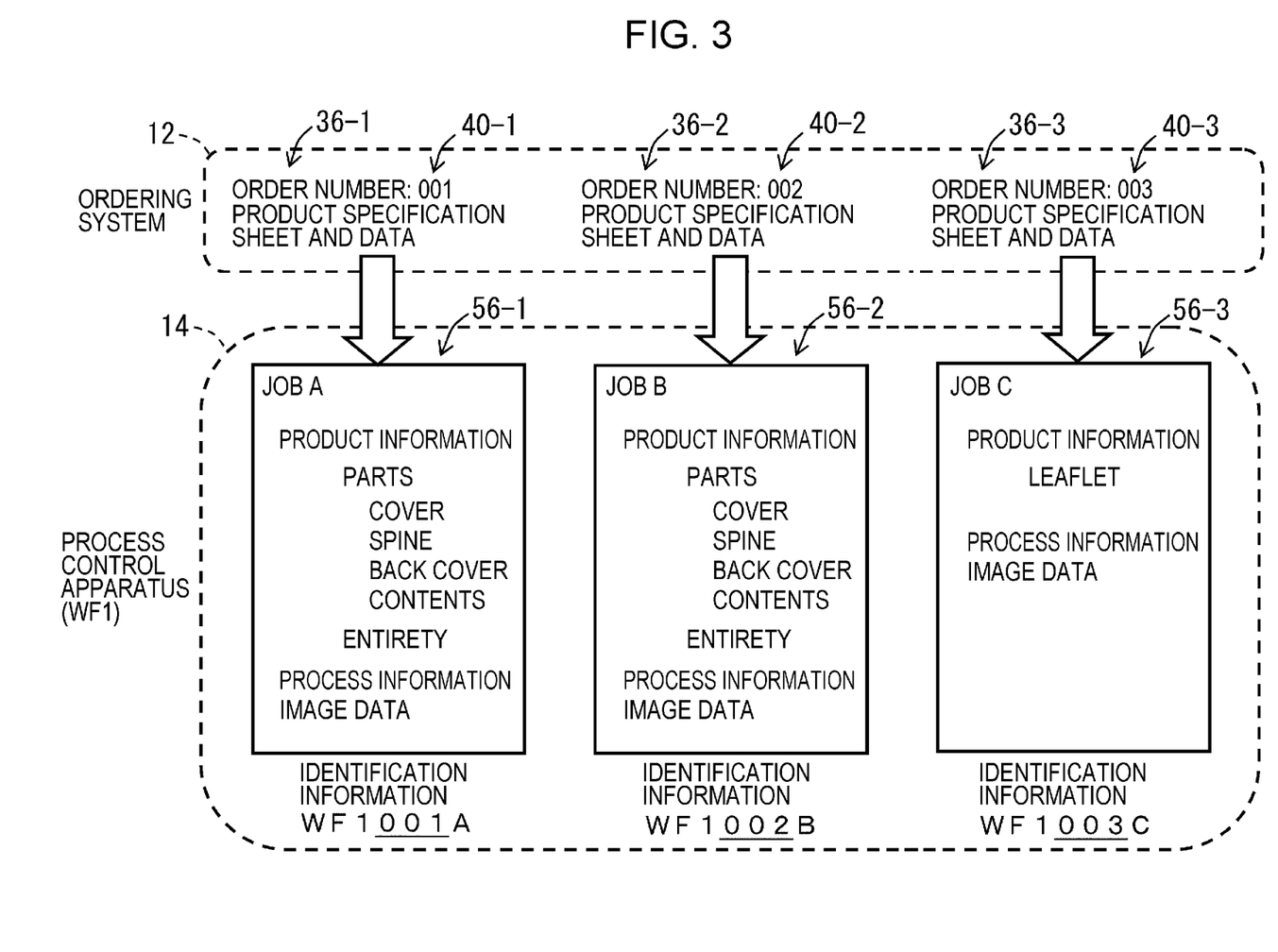
FIG. 3 illustrates a process that is performed from the reception of a production order of the printed material till the production of a job.

FIG. 3 illustrates a process performed from the reception of the production order of the printed material till the production of the job. In response to the reception of the instruction for the production order of the printed material, the ordering system 12 issues an order number 40 as an order identifier. The ordering system 12 stores on the memory 32 the data received from the customer (the product specification sheet and the document and image data) linked to the order number 40. The data (the product specification sheet and the document and image data) received from the customer linked to the order number 40 is hereinafter referred to as production order information 36.

Referring to FIG. 3, order number 001 (40-1), order number 002 (40-2), and order number 003 (40-3) are respectively issued in response to three production order instructions, and three pieces of production order information 36-1, 36-2, and 36-3 are stored on the memory 32 in the ordering system 12.

The job 56 is created in response to the production order information 36. The job 56 is a production instruction for the printed material interpreted by the print control apparatus 18 in the printing system 16. For example, the job 56 is a digital file or a group of digital files, each digital file including print target data and data indicating a printing form. The material to be printed may be in a book-form. As illustrated in job A (56-1) and job B (56-2) in FIG. 3, each job includes, on each component forming a printed material (such as a cover, back cover, contents, and the like), product information (sheet sizes, types, number of sheets, locations of images, and the like) and process information (such as process contents, flow of process, and the like), product information and process information on the overall printed material, and image data for printing. The process information includes, in addition to the information related to printing, information on paper processing after printing (for example, saddle stitching operation, folding operation, and cutting operation). The printed material may be one-sheet printing type, such as a leaflet. In such a case, referring to a job C (56-3) in FIG. 3, the printed material has a simple structure with no difference between a component and entirety and the process information is related to only information for printing.

In order to create the job 56, the user uses the user terminal 24 to operate a computer (not illustrated) connected to the process control apparatus 14 or the network 26. Alternatively, the job 56 may be automatically created by a computer (not illustrated) connected to the process control apparatus 14 or the network 26. The job 56 is then stored on the memory 52 in the process control apparatus 14. Referring to FIG. 3, three jobs A (56-1), B (56-2), and C (56-3) are created in response to the three pieces of production orders 36-1, 36-2, and 36-3.

The process control apparatus 14 attaches an order number (order identifier) to the job 56. Specifically, the order number is attached to the file name of a digital file forming the job 56 or is included in the digital file. According to the exemplary embodiment, referring to FIG. 3, identification information (such as WF1001A), including an identifier (such as WF1) of the process control apparatus 14 and the order number 40 (such as 001A), is attached to the file name of the digital file forming the job 56 or is included in the digital file. Referring to FIG. 3 and subsequent figures, each order number of the identification information is underlined.

Referring to FIG. 3, the identification information WF1001A is attached to the job A (56-1) created from the production order information 36-1 identified by the order number 001, the identification information WF1002B is attached to the job B (56-2) created from the production order information 36-2 identified by the order number 002, and the identification information WF1003C is attached to the job C (56-3) created from the production order information 36-3 identified by the order number 003.

Figure 4:
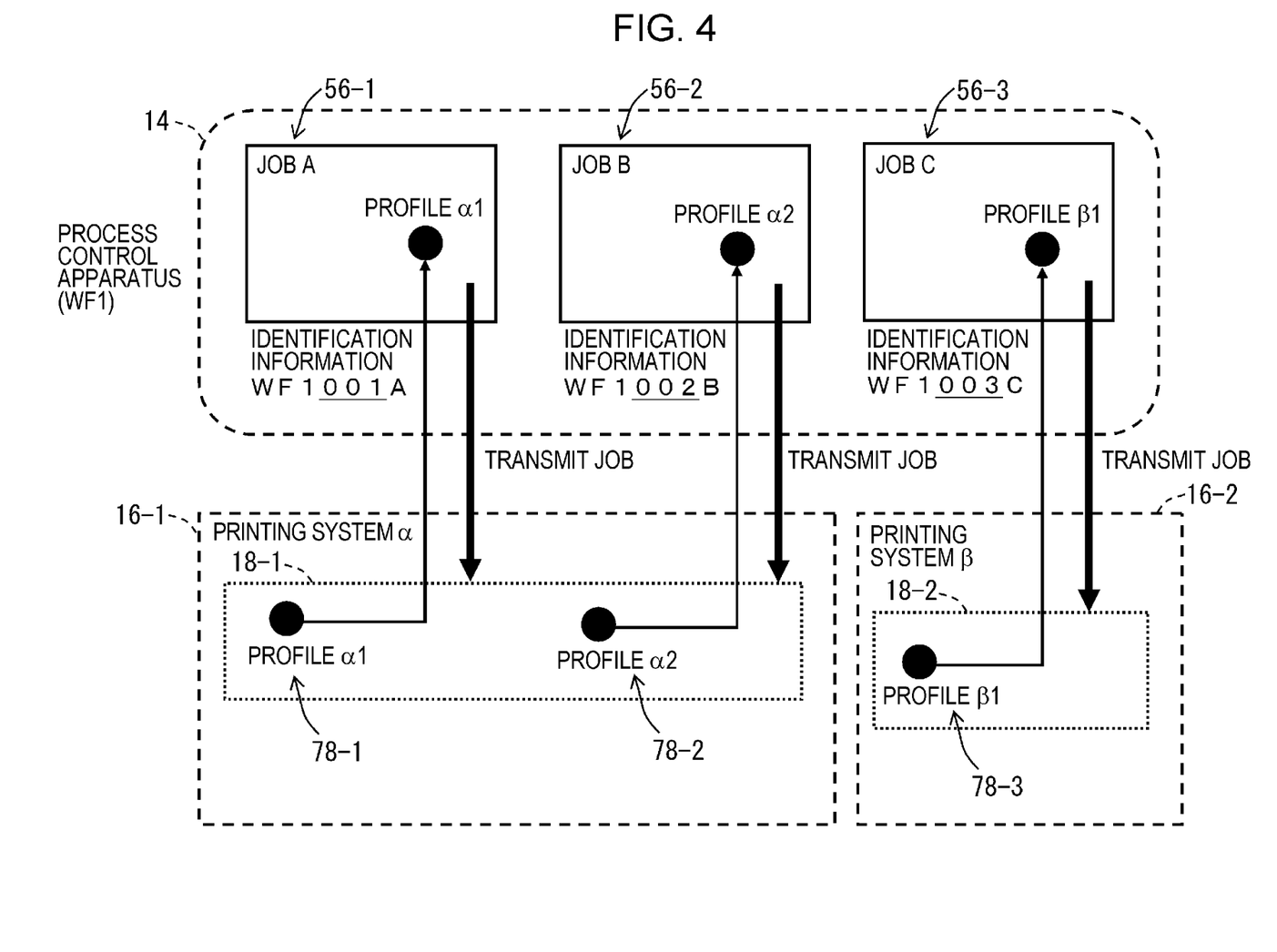
FIG. 4 illustrates a process that transmits the job to a printing system to which the job is assigned.

The job 56 is assigned to the printing system 16. The operator may operate the process control apparatus 14 using the user terminal 24 to assign the job 56 to the printing system 16 or the process control apparatus 14 automatically operates to assign the job 56 to the printing system 16. The process control apparatus 14 transmits the job 56 to the printing system 16 to which the job 56 has been assigned. Referring to FIG. 4, job A (56-1) and job B (56-2) are assigned to printing system α (16-1) and thus transmitted to the printing system α (16-1). Job C (56-3) is assigned to printing system β (16-2) and thus transmitted to the printing system β (16-2).

Referring to FIG. 4, printer profiles α1 (78-1), α2 (78-2), and β1 (78-3) are respectively attached to job A (56-1), job B (56-2), and job C (56-3) and then the job A (56-1), job B (56-2), and job C (56-3) are transmitted to the printing system α (16-1) or the printing system β (16-2). The printer profile 78 is prepared in view of characteristics of the printer and the type of paper sheets to be used for printing. The printer profile 78 is information indicating the characteristics, such as a range of colors represented by the printer, gradation of the colors, and color forming. After the job 56 is received by the print control apparatus 18 in the printing system 16, the printer profile 78 may be attached to the job 56 by the print control apparatus 18.

Figure 5:
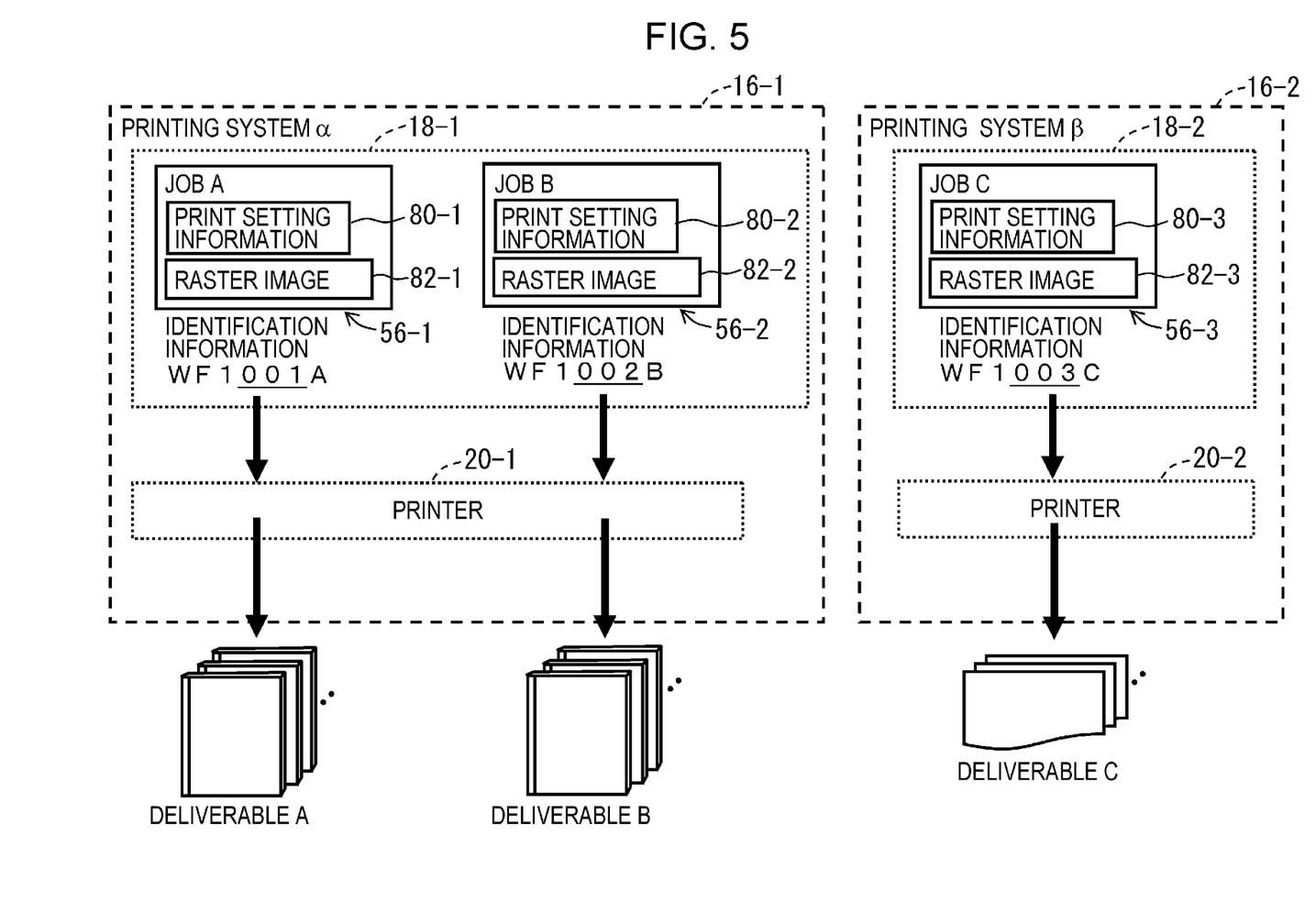
FIG. 5 illustrates a process that the printing system performs on the job.

The print control apparatus 18 in the printing system 16 receives the job 56 from the process control apparatus 14 and stores the received job 56 on the memory 72 in the print control apparatus 18. Referring to FIG. 5, the print control apparatus 18-1 in the printing system α (16-1) receives the job A (56-1) and job B (56-2) and stores the received job A (56-1) and job B (56-2) on the memory thereof. The print control apparatus 18-2 in the printing system β (16-2) receives the job C (56-3) and stores the received job C (56-3) on the memory thereof.

The print control apparatus 18 creates a raster image 82 by performing the RIP operation in accordance with the job 56. In this case, the print control apparatus 18 creates the raster image 82 using print setting information 80. The print setting information 80 includes a variety of setting information affecting the process of the printer 20 and is related to a raster image creation operation or an operation preceding the raster image creation operation. The setting information, related to the raster image creation operation or the operation preceding the raster image creation operation, represents the type of RIP, type of printer profile, and color adjustment (correction). From among pieces of the print setting information 80, information, which is not included in the job 56 received from the process control apparatus 14 but is still to be used for printing, may be set by the operator of the print control apparatus 18. Some of the variety pieces of the print setting information 80 included in the job 56 received from the process control apparatus 14 may be modified by the operator of the print control apparatus 18.

The print control apparatus 18 manages the created raster image 82 and the job 56 in a linked state on the memory 72. The print control apparatus 18 transmits instructions, the raster image 82, and the like to the printer 20. The printer 20 outputs the printed material (deliverable) by receiving and processing the instructions, the raster image 82, and the like.

Referring to FIG. 5, print setting information 80-1 and raster image 82-1 are linked to the job A (56-1) and a deliverable A is obtained in response to the job A (56-1). The same is true of the job B (56-2) and job C (56-3). A deliverable B is obtained in response to the job B (56-2) and a deliverable C is obtained in response to the job C (56-3). Referring to FIG. 5, the printer 20-1 concurrently processes the job A (56-1) and job B (56-2), but alternatively, the printer 20-1 may successively process the job A (56-1) and job B (56-2) with time shifting.

If the job 56 includes instructions for paper processing (post-processing operations: saddle stitching operation, folding operation, and cutting operation) as illustrated in the job A (56-1) and job B (56-2), the paper processing is performed after the printing of the image onto a paper sheet and then printed material is output from the printer 20 (see deliverables A and B in FIG. 5). On the other hand, if the job 56 does not include any instruction for the paper processing as in the job C (56-3), the printed material (paper sheet) is output from the printer 20 after the printing of the image to the paper sheet (see deliverable C in FIG. 5).

An instruction to perform the RIP operation, an instruction to cause the printer 20 to print, and other instructions may be performed when the operator operates the print control apparatus 18. Alternatively, the print control apparatus 18 may automatically perform these operations. Specifically, after receiving the job 56 from the process control apparatus 14, the print control apparatus 18 performs any operation, which is to be performed, on the job 56 and then provides a print instruction to the printer 20.

The print control apparatus 18 periodically reports a process status on each job 56, stored on the memory 72, to the process control apparatus 14. Upon receiving the report, the process control apparatus 14 updates the progress information 55 on the memory 52.

After being processed by the printing system 16, the job 56 is not immediately deleted from the print control apparatus 18 but is still continuously stored on the print control apparatus 18 for re-processing for a predetermined period of time. The process control apparatus 14 manages the progress status of the job 56 after transmitting the job 56 to the printing system 16 but does not manage the job 56 (the digital file or the group of digital files).

Figure 6:
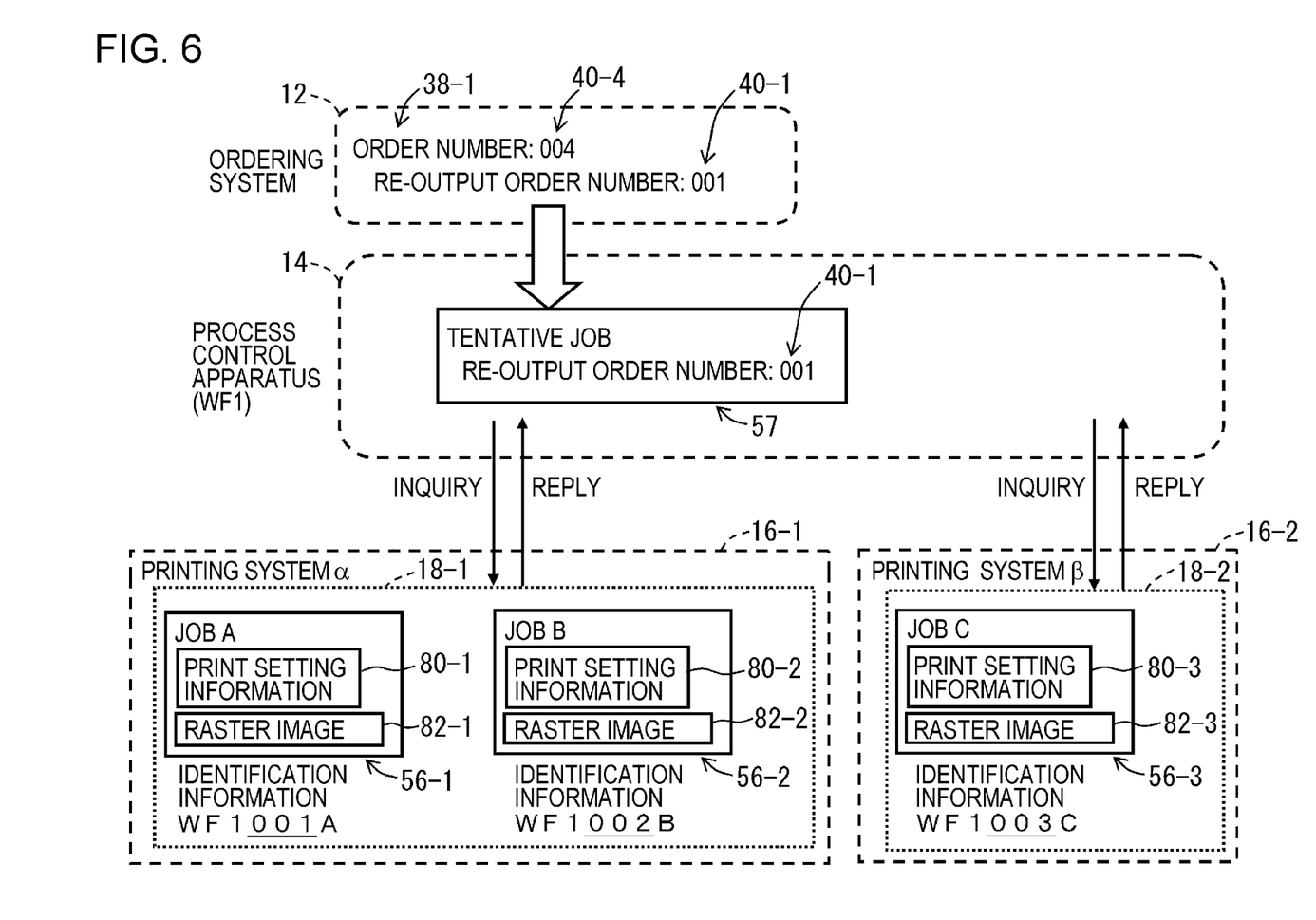
FIG. 6 illustrates a flow of a process performed when a reproduction order of the printed material is received.

A process performed when a reproduction order of the printed material is received from the customer is described below. FIG. 6 illustrates the process performed by the production management system 10 when the order to reproduce the deliverable A (see FIG. 5) is received from the customer. The ordering system 12 receives, from the computer terminal, an instruction to reproduce the printed material and an order number 40-1 ("001" in FIG. 6) linked to the previous production order corresponding to the printed material that is to be reproduced. In this way, at the request of the reproduction, the product specification sheet and the document and image data are not received from the customer but the order number 40-1 linked to the previous production order is received.

In response to the reception of the reproduction order instruction, the ordering system 12 issues a new order number 40-4 ("004" in FIG. 6) for the reproduction order. The ordering system 12 stores the issued order number 40-4, order number 40-1 of the previous production order, and information indicating re-outputting, in an linked form on the memory 32. In the following discussion, these pieces of information are referred to as reproduction order information 38. The reproduction order information 38 may include the number of copies of the printed material to be produced. Referring to FIG. 6, the memory 32 in the ordering system 12 stores reproduction order information 38-1 related to the re-outputting of the printed material having the order number 40-1 (001).

The ordering system 12 transmits the reproduction order information 38 to the process control apparatus 14. In response to the reception of the reproduction order information 38, the process control apparatus 14 stores the reproduction order information 38 in the form of a tentative job 57 on the memory 52. The process control apparatus 14 asks the print control apparatuses 18-1 and 18-2 in the printing systems α (16-1) and β (16-2) whether the print control apparatuses 18-1 and 18-2 have the job 56 with the order number 40-1 (001 in FIG. 6) of the previous production order defined in the tentative job 57. The print control apparatuses 18-1 and 18-2 reply to the inquiries of the process control apparatus 14.

The status of the printing systems α (16-1) and β (16-2) in FIG. 6 is that the outputting of the printed materials (deliverables A, B, and C) in FIG. 5 is complete, the print control apparatus 18-1 stores the job A (56-1) and job B (56-2), and the print control apparatus 18-2 stores the job C (56-3). Identification information "WF1001A," "WF1002B," and "WF1003C" are respectively attached to the jobs A (56-1), B (56-2), and C (56-C). Of the identification information, 001, 002, and 003 are order numbers. The print control apparatus 18-1 has the job (the job A having the identification information WF1001A) having the order number 001 responsive to the inquiry from the process control apparatus 14 and the print control apparatus 18-1 thus returns to the process control apparatus 14 a reply indicating that the print control apparatus 18-1 has the job responsive to the inquiry. On the other hand, the print control apparatus 18-2 does not store the job having the order number 001 responsive to the inquiry from the process control apparatus 14 and thus returns to the process control apparatus 14 a reply indicating that the print control apparatus 18-2 does not store the job responsive to the inquiry.

In response to the replies from the print control apparatuses 18-1 and 18-2, the process control apparatus 14 detects the printing system 16 storing the job 56 responsive to the reproduction order. Referring to FIG. 6, the process control apparatus 14 detects the printing system α (16-1) storing the job A (56-1). The process control apparatus 14 stores on the memory 52 the identification information (α in FIG. 6) on the detected printing systems 16-1. Using the user terminal 24, the operator accesses the process control apparatus 14 to verify the detected printing systems 16-1. The operator operates the print control apparatus 18-1 in the detected printing system 16-1 (the printing system α in FIG. 6) and specifies the job 56 (the job A (56-1) in FIG. 6) responsive to the reproduction order to provide a print instruction. The deliverable corresponding to the reproduction order may thus be obtained.

According to the exemplary embodiment, when the reproduction order of the printed material is received from the customer, the operator may save time used to search for the printing system 16 storing the job 56 responsive to the reproduction order.

Figure 7:
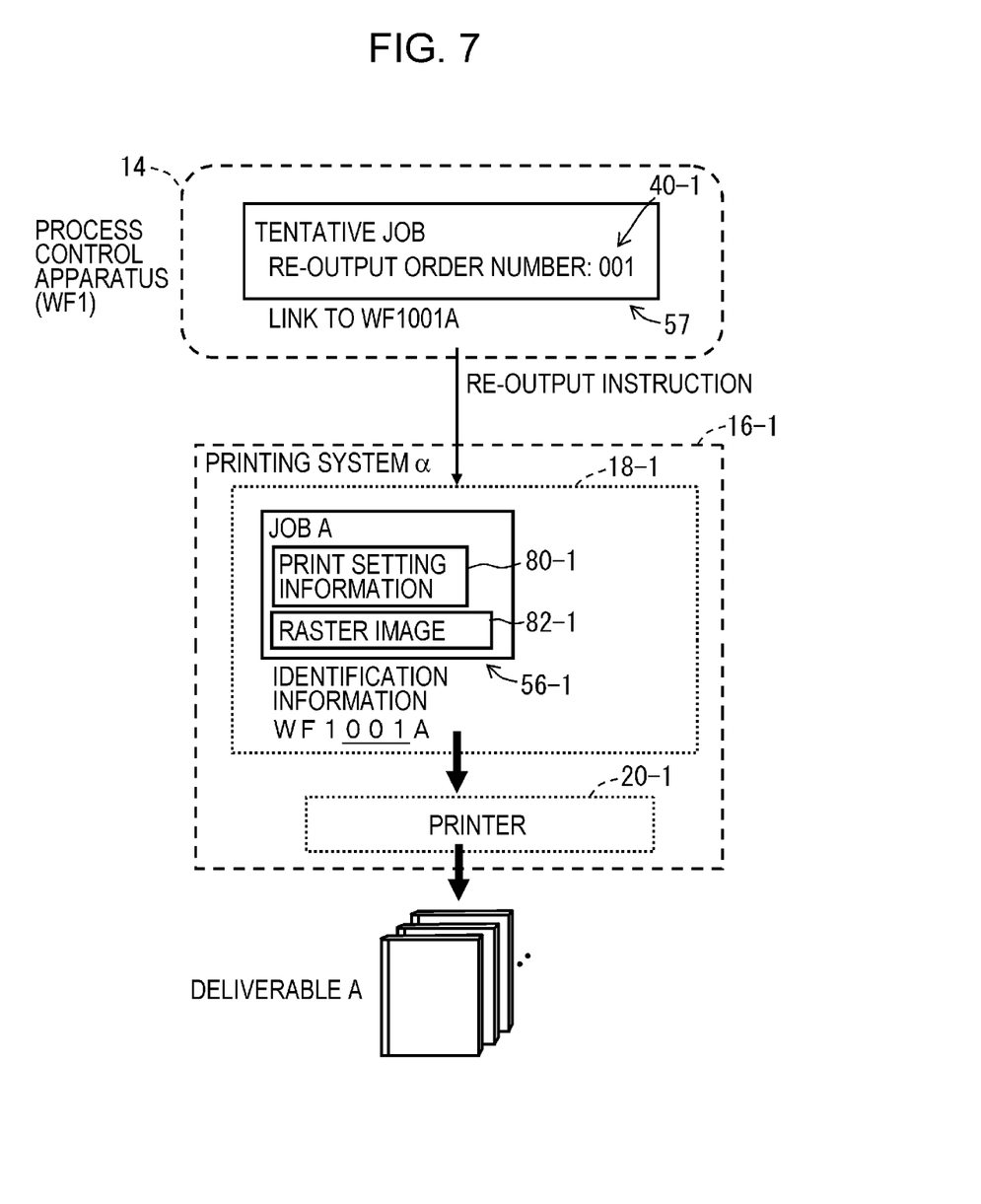
FIG. 7 illustrates a flow of a process performed when the reproduction order of the printed material is received.

As illustrated in FIG. 7, the process control apparatus 14 gives an instruction (re-output instruction) to process the job A (56-1) to the print control apparatus 18-1 storing the job A (56-1) responsive to the reproduction order. In such a case, in response to the instruction, the print control apparatus 18-1 transmits to the printer 20 the raster image 82 and an instruction corresponding to the job A (56-1) responsive to the reproduction order. The printed material (deliverable A) responsive to the reproduction order from the printer 20-1 is automatically output. In this way, the user may save the time used to provide the print instruction using the print control apparatus 18-1.

The print control apparatus 18-1 may notify the process control apparatus 14 of the identification information (WF1001A in FIG. 7) on the job A (56-1) responsive to the reproduction order and the process control apparatus 14 may manage the identification information and the tentative job 57 in a linked form. The print control apparatus 18-1 may periodically report to the process control apparatus 14 the process status of the job A (56-1) responsive to the reproduction order and the process control apparatus 14 may update the progress information 55 on the tentative job 57 in response to the reception of the process status.

Although the job A (56-1) responsive to the reproduction order is stored on the print control apparatus 18-1, the raster image 82-1 linked thereto may be deleted. In such case, the raster image 82-1 may be created again in accordance with the job A (56-1) and then the printing may thus be performed.

Although the job A (56-1) responsive to the reproduction order is stored on the print control apparatus 18-1 in the printing system α (16-1), the printing system α (16-1) may not be immediately available to process the job A (56-1). For example, the printer 20-1 in the printing system α (16-1) may be processing another job or malfunctioning with paper jamming. To address such occasions, the production management system 10 may be operated as illustrated in FIG. 8.

Figure 8:
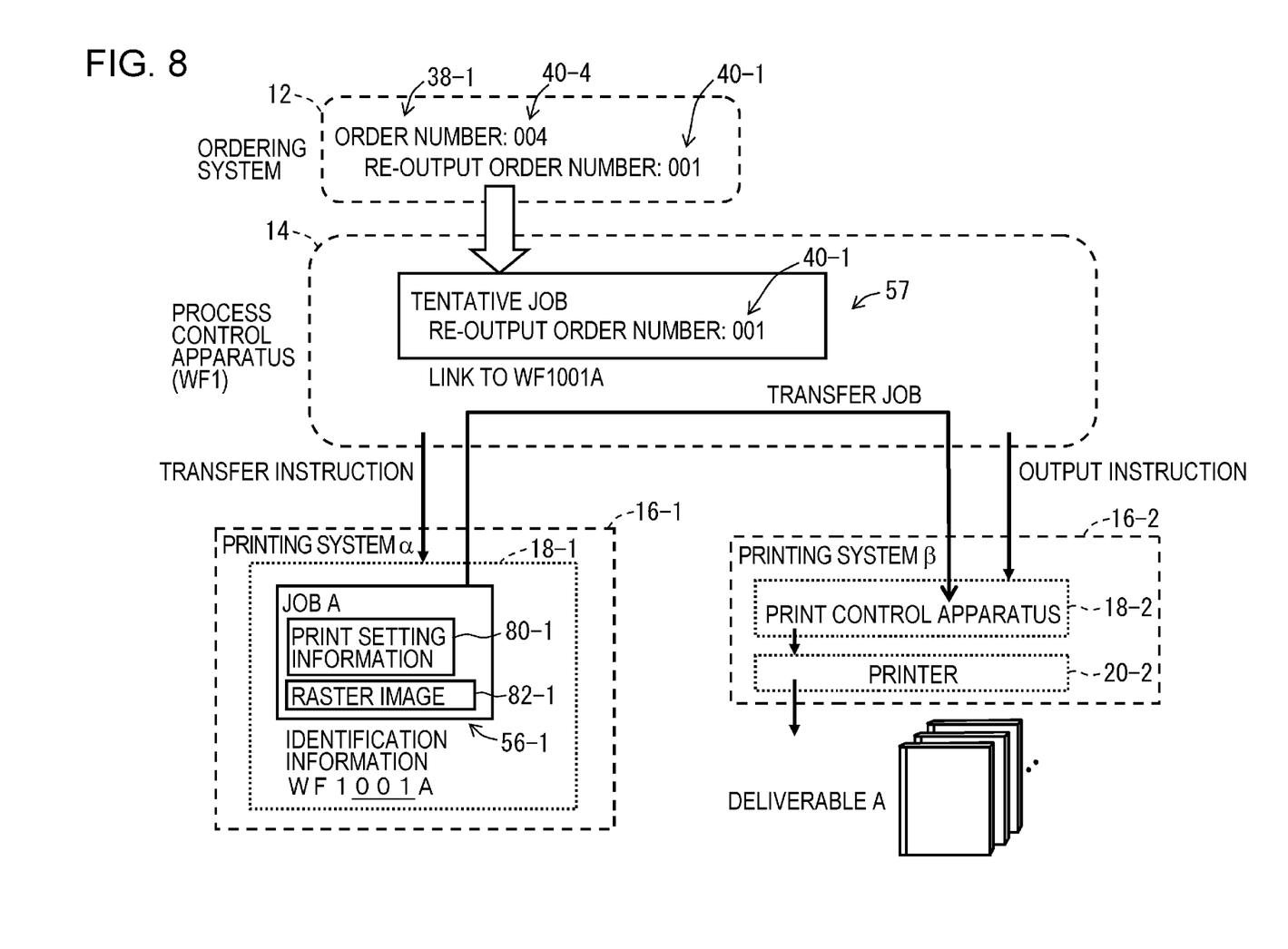
FIG. 8 illustrates a process where a job corresponding to the reproduction order is transferred to another printing system.

Referring to FIG. 8, the process control apparatus 14 asks the print control apparatus 18-1 storing the job A (56-1) responsive to the reproduction order whether the print control apparatus 18-1 is enabled to immediately process the job A (56-1). The print control apparatus 18-1 replies to the inquiry. If the reply from the print control apparatus 18-1 indicates that immediately processing is difficult, the process control apparatus 14 instructs the print control apparatus 18-1 to transfer the job A (56-1) responsive to the reproduction order to the print control apparatus 18-2 in another printing system (printing system β (16-2)). In response to the transfer instruction, the print control apparatus 18-1 transfers the job A (56-1) responsive to the reproduction order to the print control apparatus 18-2 in the printing system β (16-2). The job A (56-1) is transferred via the process control apparatus 14 as illustrated in FIG. 8. Alternatively, the job A (56-1) may be directly transferred from the print control apparatus 18-1 to the print control apparatus 18-2.

The print control apparatus 18-2 stores the received job A (56-1) on the memory thereof. The process control apparatus 14 instructs the print control apparatus 18-2 to process the job A (56-1). Alternatively, the operator operates the print control apparatus 18-2, providing an instruction to print the job A (56-1). The printer 20-2 in the printing system β (16-2) outputs the printed material (deliverable A) responsive to the reproduction order. In this way, the printed material responsive to the reproduction order may be obtained in a shorter period of time than when the processing waits until the printing system α (16-1) storing the job A (56-1) responsive to the reproduction order becomes available.

According to the exemplary embodiment, if the printer 20-1 in the printing system α (16-1) serving as a source is different in type from the printer 20-2 in the printing system β (16-2) serving as a destination, part of the print setting information 80-1 (for example, the printer profile) that applies to the received job A (56-1) may be modified. In such a case, the print control apparatus 18-2 at the destination re-creates the raster image 82-1 by modifying the print setting information 80-1 applied to the job A (56-1) and then performs printing.

Figure 9:
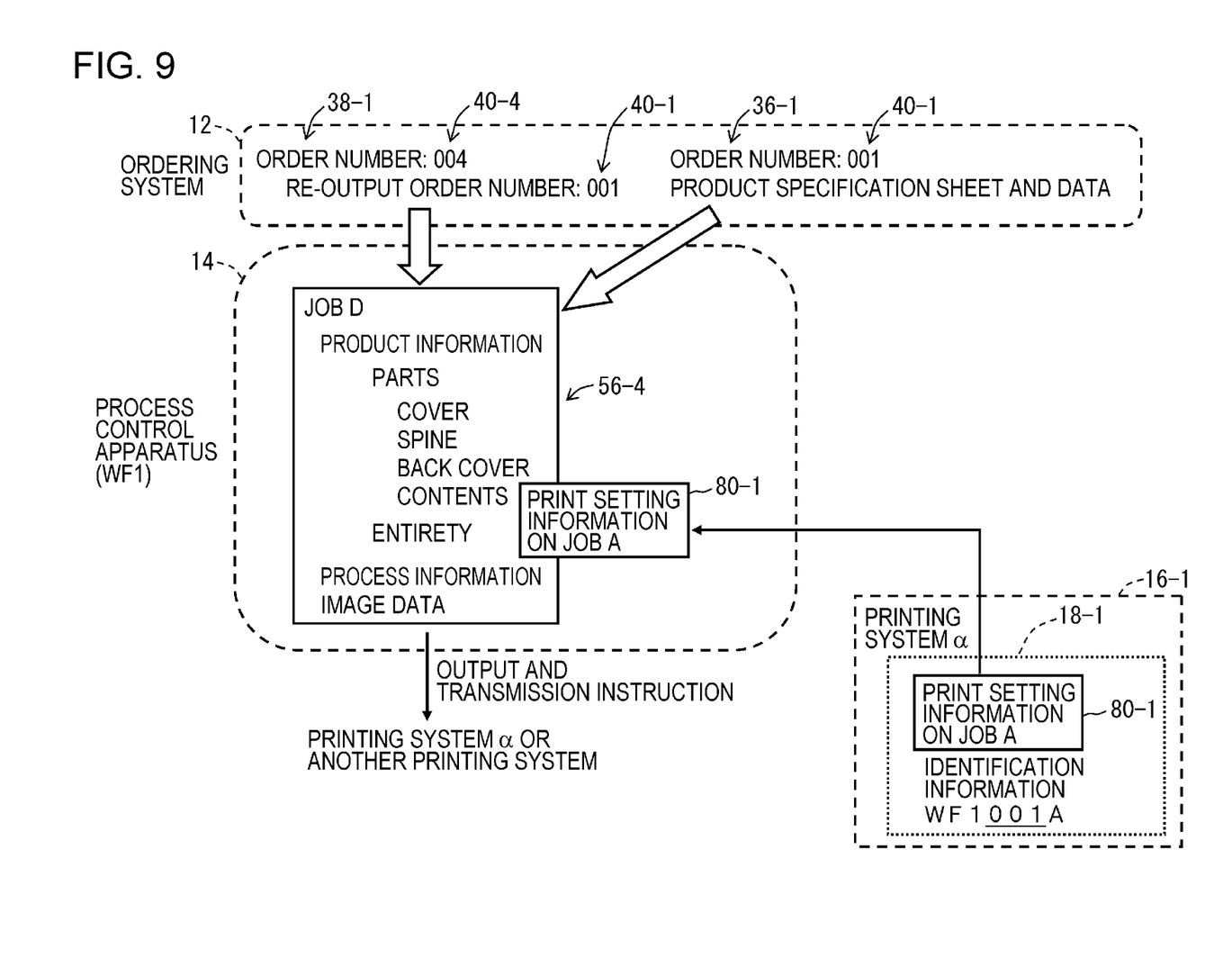
FIG. 9 illustrates a process where a new job corresponding to the reproduction order is created.

There is a case that none of the printing systems 16 store the job 56 responsive to the reproduction order. For example, the job 56 responsive to the reproduction order, stored on the print control apparatus 18 in the past, is deleted by the operator. Referring to FIG. 9, in connection with the reproduction order information 38-1, the ordering system 12 searches for the production order information 36-1 (the product specification sheet and the document and image data) that is linked to the order number 40-1 (001 in FIG. 9) of the previous production order. In accordance with the found production order information 36-1, a new job D (56-4) is created and then stored on the memory 52 in the process control apparatus 14.

Although the job A (56-1) responsive to the reproduction order is not present on the print control apparatus 18-1, there is a possibility that the print setting information 80-1 applied to the job A (56-1) still remains. In such a case, the process control apparatus 14 acquires from the print control apparatus 18-1 the print setting information 80-1 attached to the job A (56-1) responsive to the reproduction order and attaches the print setting information 80-1 to the new job D (56-4). The job D (56-4) is assigned to one of the multiple printing systems 16 and the process control apparatus 14 transmits the job D (56-4) to that printing system 16. Since the job D (56-4) is processed by the printing system 16, the printed material responsive to the reproduction order is obtained. By attaching the previously applied print setting information 80-1 to the new job D (56-4), the printed material responsive to the reproduction order may result in a shorter period of time than when the print setting information on the new job D (56-4) is created from the beginning.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A job management apparatus comprising:
a processor configured to:
transmit a job to a printing system of a plurality of printing systems to perform the job which is associated with an order identifier and is created in response to a production order of a printed material;
receive an instruction to perform another iteration of the job;
attach the order identifier, linked to the production order, to a job that has been created in response to the production order of the printed material;
transmit the job and the order identifier attached to the job to the printing system of a plurality of printing systems to perform the job;
when one of the order identifiers is specified and a reproduction order of the printed material corresponding to the specified order identifier is received, make an inquiry to the printing systems as to whether the printing systems have the job with the specified order identifier attached;
in response to a reply from each of the printing systems responding to the inquiry, detect a printing system storing the job corresponding to the reproduction order;
if the printing system having the job corresponding to the reproduction order is detected, instruct the same printing system to process the job corresponding to the reproduction order;
if the printing system storing the job corresponding to the reproduction order is unable to process the job, instruct the printing system to transfer the job to a second printing system of the plurality of printing systems; and
instruct the second printing system having received the job corresponding to the reproduction order to process the job.

2. The job management apparatus according to claim 1, wherein if the printing system storing the job corresponding to the reproduction order is not detected in response to the inquiry, a new job is created in response to the reproduction order, and
wherein the processor is configured to attach, to the new job, print setting information attached to the job corresponding to the reproduction order and transmit the new job to the printing system of the printing systems to cause the new job to be processed.

3. A non-transitory computer readable medium storing a program causing a computer to execute a process, the process comprising:
transmitting a job to a printing system of a plurality of printing systems to perform the job which is associated with an order identifier and is created in response to a production order of a printed material;
receiving an instruction to perform another iteration of the job;
attaching the order identifier, linked to the production order, to the job that has been created in response to the production order of the printed material;
transmitting the job and the order identifier attached to the job to the printing system of a plurality of printing systems to perform the job;
when one of the order identifiers is specified and a reproduction order of the printed material corresponding to the specified order identifier is received, making an inquiry to the printing systems as to whether the printing systems have the job with the specified order identifier attached;
in response to a reply from each of the printing systems responding to the inquiry, detecting a printing system storing the job corresponding to the reproduction order;
if the printing system having the job corresponding to the reproduction order is detected, instructing the same printing system to process the job corresponding to the reproduction order;
if the printing system storing the job corresponding to the reproduction order is unable to process the job, instruct the printing system to transfer the job to a second printing system of the plurality of printing systems; and
instruct the second printing system having received the job corresponding to the reproduction order to process the job.

4. A job management method comprising:
transmitting a job to a printing system of a plurality of printing systems to perform the job which is associated with an order identifier and is created in response to a production order of a printed material;
receiving an instruction to perform another iteration of the job;
attaching the order identifier, linked to the production order, to the job that has been created in response to the production order of the printed material;
transmitting the job and the order identifier attached to the job to the printing system of a plurality of printing systems to perform the job;
when one of the order identifiers is specified and a reproduction order of the printed material corresponding to the specified order identifier is received, making an inquiry to the printing systems as to whether the printing systems have the job with the specified order identifier attached;
in response to a reply from each of the printing systems responding to the inquiry, detecting a printing system storing the job corresponding to the reproduction order;
if the printing system having the job corresponding to the reproduction order is detected, instructing the same printing system to process the job corresponding to the reproduction order;
if the printing system storing the job corresponding to the reproduction order is unable to process the job, instruct the printing system to transfer the job to a second printing system of the plurality of printing systems; and instruct the second printing system having received the job corresponding to the reproduction order to process the job.

\* \* \* \* \*